Jan. 14, 1930.  W. S. ALLEN  1,743,700
METHOD FOR TREATING GASES
Filed Nov. 17, 1925
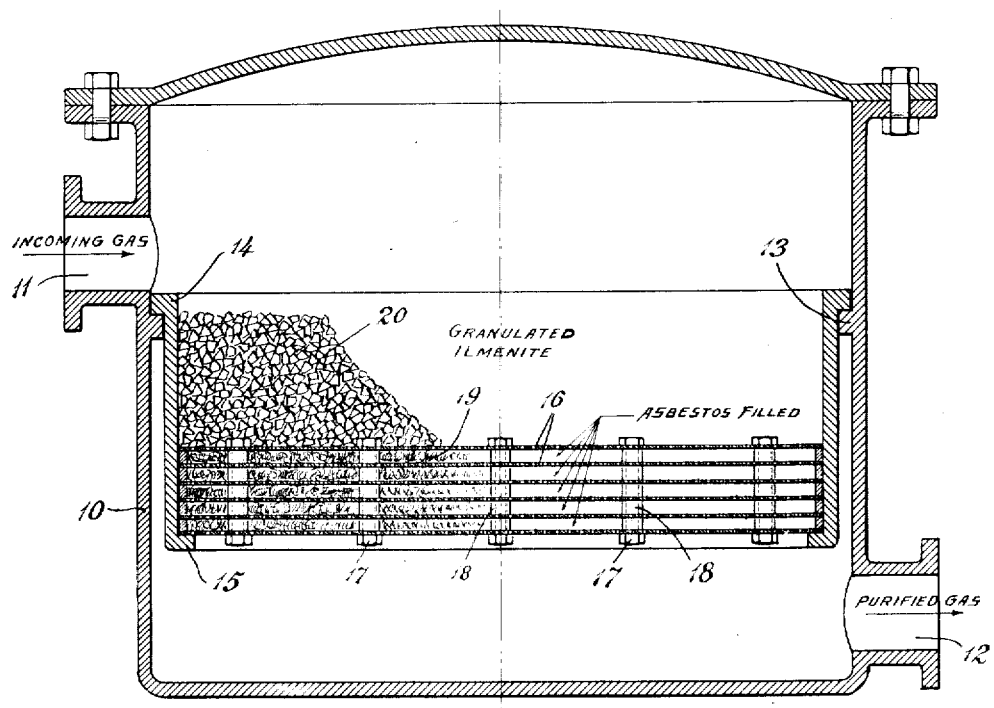
WITNESS
G. V. Rasmussen
INVENTOR
WALTER S. ALLEN
BY
ATTORNEYS Patented Jan. 14, 1930

1,743,700

UNITED STATES PATENT OFFICE

WALTER S. ALLEN, OF FLUSHING, NEW YORK, ASSIGNOR TO GENERAL CHEMICAL COMPANY, OF NEW YORK, N. Y., A CORPORATION OF NEW YORK

METHOD FOR TREATING GASES

Application filed November 17, 1925. Serial No. 69,613.

This invention relates to catalytic conversion processes for the production of sulfuric acid and has for its principal object to provide a new and improved process of great simplicity and efficiency for conducting the formation of sulfuric anhydride from the gases passing to the converter.

In connection with the catalytic conversion of sulfur dioxide and oxygen into sulfuric anhydride as a step in the process of the manufacture of sulfuric acid, platinum in one form or another as a catalyzer has been found to give the most efficient conversion and therefore is most generally employed. Platinum however is very costly and moreover is rendered ineffective as a catalyst by certain impurities, which are usually present in the gases. The presence of arsenic in the burner gases is particularly poisonous to platinum and for this reason it has heretofore been found necessary when platinum is used as a catalyzer to rely upon various intricate purification processes, which generally result in cooling and consequently wastefully dissipating the heat of the gases. Various suggestions have been made to substitute other materials such as vanadium, iron oxide, and other oxides such as titanium oxide, for platinum as a catalyzer. None of these other materials however give as efficient a conversion as platinum and therefore the latter substance is still generally employed in association with various intricate processes for purifying the gases to prevent deterioration of the platinum.

I have discovered that the mineral compound of oxygen, titanium and iron of the composition $(FeTi)_2O_8$ which occurs in nature and is known as ilmenite possesses, after being properly treated or prepared, the property of removing the arsenic from the $SO_2$ gases. Generally speaking, the treatment or preparation of the ilmenite is such that the ilmenite is activated to augment its extractive capacity for arsenical substances.

An illustrative example of one method of conducting such treatment or preparation is hereinafter set forth.

According to the preferred treatment employed by me the ilmenite ore is mixed in a shallow pan with about 1½ times its weight of an 80% solution of sulfuric acid and subjected to heat until (at about 200° F.) a violent reaction occurs between the acid and the ore. During the reaction the mixture is stirred and is then allowed to set, the heating being continued until the mass is dried. About 2½ hours are required for this part of the process. The material is then removed from the pan in fairly large pieces and after having been allowed to cool, preferably in a covered vessel, these pieces are broken up to about one inch in size and then passed through grinding rolls set to crush to ¼ of an inch. The crushed material is screened through a 10 mesh screen and the fines (constituting about 30% of the product) are mixed with water to form a thick paste, which is heated to expel water and form a hard porous cake. The latter is broken down, crushed and screened in the same manner as the original batch. The product thus prepared is essentially sulfated ilmenite.

The accompanying drawing shows somewhat diagrammatically a suitable apparatus that has been satisfactorily employed in the carrying out of my invention.

As shown in the drawing the casing 10 is provided with the inlet 11 and outlet 12 both provided with flanges for connecting the casing to the $SO_2$ gas line leading from the burners and to the converter (not shown), the latter containing a catalyst filling of platinized asbestos or other suitable form of platinum. Mounted within the casing 10 and supported by an annular flange 13 projecting inwardly from the side of said casing is a tubular inner casing 14, upon the lower inturned flange 15 of which is supported a plurality of foraminated plates 16 provided with any suitable means such as the bolts 17 and collars 18 to hold them in spaced relationship. The spaces between the plates 16 are packed with asbestos or other suitable filtering medium 19 and a mass 20 of the crushed prepared ilmenite is placed within the inner casing 14 on top of the upper plate 16.

The gases containing $SO_2$ and O are passed through the casing, flowing through the mass of prepared ilmenite which acts to retain practically all the arsenic content of the gases. As the prepared ilmenite contains some $SO_3$ and $H_2SO_4$, it is advisable to prevent any loose or friable particles or dust which may become loosened from the ilmenite, from passing to the platinum contact material of the converter, therefore I have provided the asbestos filter to catch any such particles. The size of the pieces of the prepared ilmenite employed is such that they offer but a low resistance to the passage of the gases through the apparatus. A high percentage of the arsenic content of the gases can be removed by this process particularly when operating with temperatures between 700° and 1200° F., the ordinary temperature ranges encountered in the contact process. Thus continuous operation of the plant is permitted without poisoning the platinum catalyst.

While I have shown the filtering and purifying material as placed in a separate receptacle interposed within the gas line between the burner and the converter, it will be understood that the filter may be placed within the top of the converter column. Likewise, many changes in the construction of the filtering receptacle and the manner of preparing the ilmenite may be resorted to without departing from the spirit of my invention.

I am well aware of the fact that ilmenite has been proposed as a catalyst, but so far as I know I was the first to discover the valuable properties of ilmenite as a remover of arsenic, and to use ilmenite as a purifying agent in a step preceding the main or catalytic treatment with a platinum catalyst. The latter is much more powerful, as a catalyst, than ilmenite, so that, in my process, whatever catalytic effect ilmenite may have, is entirely incidental and quite subordinate to the catalytic effect of the platinum. On the other hand, the purifying effect of ilmenite, especially as regards the removal of arsenic, is of paramount importance in my process.

I claim:

1. The process of making sulfuric anhydride gas by the catalytic oxidation of sulfur dioxide which consists in passing the gas intended for the catalysis through a mass of sulfated ilmenite and then through platinum catalytic material.

2. In the process of making sulfuric anhydride gas by the catalytic oxidation of sulfur dioxide the steps which consist in passing the gas intended for the catalysis through a mass of sulfated ilmenite and thence through a filtering medium.

3. In the process of converting sulfur dioxide to sulfuric anhydride by the use of platinum catalytic material, the step of purifying the sulfur dioxide gas by passing it through a mass of sulfated ilmenite before said gas passes to said platinum material.

4. In the process of converting sulfur dioxide to sulfuric anhydride by the use of platinum catalytic material, the step of purifying the sulfur dioxide gas by passing it through a mass of sulfated ilmenite and then through a filtering medium.

5. In the process of converting sulfur dioxide to sulfuric anhydride by the use of platinum catalytic material, the step of removing arsenic from the sulfur dioxide gas by passing it, prior to its contact with the platinum catalytic material, through a mass of ilmenite activated to augment its extractive capacity for arsenical substances.

6. In the process of converting sulfur dioxide to sulfuric anhydride by the use of platinum catalytic material, the step of removing arsenic from the sulfur dioxide gas by passing it through a mass of ilmenite activated to augment its extractive capacity for arsenical substances and then through a filtering medium.

7. In the process of converting sulfur dioxide to sulfuric anhydride by the use of platinum catalytic material, the step of removing arsenic from the sulfur dioxide gas by passing it, prior to its contact with the platinum catalytic material, through a mass of ilmenite activated to augment its extractive capacity for arsenical substances and maintaining said gas in its passage through said ilmenite at a temperature between 700° and 1200° F.

8. In the process of converting sulfur dioxide to sulfuric anhydride by the use of platinum catalytic material, the step of removing arsenic from the sulfur dioxide gas by passing it through a mass of ilmenite activated to augment its extractive capacity for arsenical substances, and consisting of particles having a dimension of approximately ¼ of an inch.

9. The process of making sulfuric anhydride which consists in subjecting gas containing $SO_2$ and O to the action first of sulfated ilmenite and then of platinum.

10. The process of removing arsenical impurities from gases, which consists in bringing the gases into contact with a mass of sulfated ilmenite.

11. The process of removing arsenical impurities from a gas mixture containing $SO_2$ which consists in bringing the gases in contact with sulfated ilmenite.

12. The process of purifying a gas mixture of arsenical impurities, which consists in bringing the gases in contact with sulfated ilmenite at a temperature between about 700° F. and 1200° F.

13. The process of making sulfuric anhydride which consists in passing the gas mixture containing $SO_2$ in contact with a mass of sulfated ilmenite and then converting the $SO_2$ to $SO_3$ by means of a catalyst.

14. The process of removing arsenical impurities from sulfur dioxide gas which consists in bringing the gas in contact with sulfated ilmenite at a temperature between 700° F. and 1200° F.

WALTER S. ALLEN.

Certificate of Correction

Patent No. 1,743,700.          Granted January 14, 1930, to

WALTER S. ALLEN

It is hereby certified that error appears in the printed specification of the above numbered patent requiring correction as follows: Page 1, line 38, for "$(FeTi)_2O_3$" read ($FeTiO_3$); and that the said Letters Patent should be read with this correction therein that the same may conform to the record of the case in the Patent Office.

Signed and sealed this 27th day of February, A. D. 1930.

[SEAL.]

M. J. MOORE,
*Acting Commissioner of Patents.* which consists in bringing the gases in contact with sulfated ilmenite.

12. The process of purifying a gas mixture of arsenical impurities, which consists in bringing the gases in contact with sulfated ilmenite at a temperature between about 700° F. and 1200° F.

13. The process of making sulfuric anhydride which consists in passing the gas mixture containing $SO_2$ in contact with a mass of sulfated ilmenite and then converting the $SO_2$ to $SO_3$ by means of a catalyst.

14. The process of removing arsenical impurities from sulfur dioxide gas which consists in bringing the gas in contact with sulfated ilmenite at a temperature between 700° F. and 1200° F.

WALTER S. ALLEN.

Certificate of Correction

Patent No. 1,743,700.                    Granted January 14, 1930, to

WALTER S. ALLEN

It is hereby certified that error appears in the printed specification of the above numbered patent requiring correction as follows: Page 1, line 38, for "$(FeTi)_2O_3$" read ($FeTiO_3$); and that the said Letters Patent should be read with this correction therein that the same may conform to the record of the case in the Patent Office.

Signed and sealed this 27th day of February, A. D. 1930.

[SEAL.]

M. J. MOORE,
*Acting Commissioner of Patents.*